United States Patent [19]
Flammer et al.

[11] Patent Number: 4,939,726
[45] Date of Patent: Jul. 3, 1990

[54] METHOD FOR ROUTING PACKETS IN A PACKET COMMUNICATION NETWORK

[75] Inventors: George H. Flammer; Robert L. Kalkwarf, both of San Jose, Calif.

[73] Assignee: Metricom, Inc., Campbell, Calif.

[21] Appl. No.: 383,273

[22] Filed: Jul. 18, 1989

Related U.S. Application Data

[63] Continuation of Ser. No. 133,720, Dec. 16, 1987, abandoned.

[51] Int. Cl.$^5$ .............................................. H04J 3/26
[52] U.S. Cl. .................................. 370/94.1; 370/94.3
[58] Field of Search ............... 370/60, 94, 60.1, 94.1, 370/94.2, 94.3; 340/825.5, 825.51

[56] References Cited

U.S. PATENT DOCUMENTS

| | | | |
|---|---|---|---|
| 4,074,232 | 2/1978 | Otomo et al. | 340/147 R |
| 4,135,156 | 1/1979 | Sanders, Jr. et al. | 343/100 ST |
| 4,168,400 | 9/1979 | deCouasnon et al. | 179/15 BA |
| 4,320,500 | 3/1982 | Barberis et al. | 370/94 |
| 4,516,239 | 5/1985 | Maxemchuk | 370/94 |
| 4,525,830 | 6/1985 | Cohen et al. | 370/60 |
| 4,534,024 | 8/1985 | Maxemchuk et al. | 370/60 |
| 4,550,402 | 10/1985 | Gable et al. | 370/60 |
| 4,598,400 | 7/1986 | Hillis | 370/94 |
| 4,644,532 | 2/1987 | George et al. | 370/94 |
| 4,661,947 | 4/1987 | Lea et al. | 370/60 |
| 4,663,758 | 5/1987 | Eambarelli et al. | 370/94 |
| 4,679,189 | 7/1987 | Olson et al. | 370/94 |

OTHER PUBLICATIONS

"AX.25 Amateur Packet-Radio Link-Layer Protocol", Version 2.0, (Oct. 1984), Publication No. 56.
Flynn, Gregory G., "Routing and Addressing Problems in Large Metropolitanscale Internetworks", ISI Research Report ISI/RR-87-180, (Mar. 1987), (Not Prior Art).

*Primary Examiner*—Douglas W. Olms
*Attorney, Agent, or Firm*—Townsend and Townsend

[57] ABSTRACT

A packet network routing method and system based on geographic coordinate identifiers is described. Each node in a network is uniquely identified by absolute geographical coordinates or by a code indicating absolute location in an external coordinate-based reference system (node coordinates), and such absolute geographical coordinates or the equivalent are employed as part of a packet identifier for each packet generated for use in making routing decisions. The node coordinates of a local node and its neighboring nodes and the packet coordinates are used by means at each node through which a packet is routed for determining a desired forwarding route of a data packet. The routing may be prioritized according to preselected criteria, preferably achieving maximum forward progress using the least amount of power. The packet routing protocol according to the invention requires no routing directory or table to perform data routing. Each node of the network collects in a table or is otherwise provided with information about the quality of communication between itself and its neighboring nodes. When a data packet has been received at a node, it is routed further through the network based on criteria derived from the history of communication between the local node and its neighbors.

2 Claims, 1 Drawing Sheet

U.S. Patent
Jul. 3, 1990
4,939,726
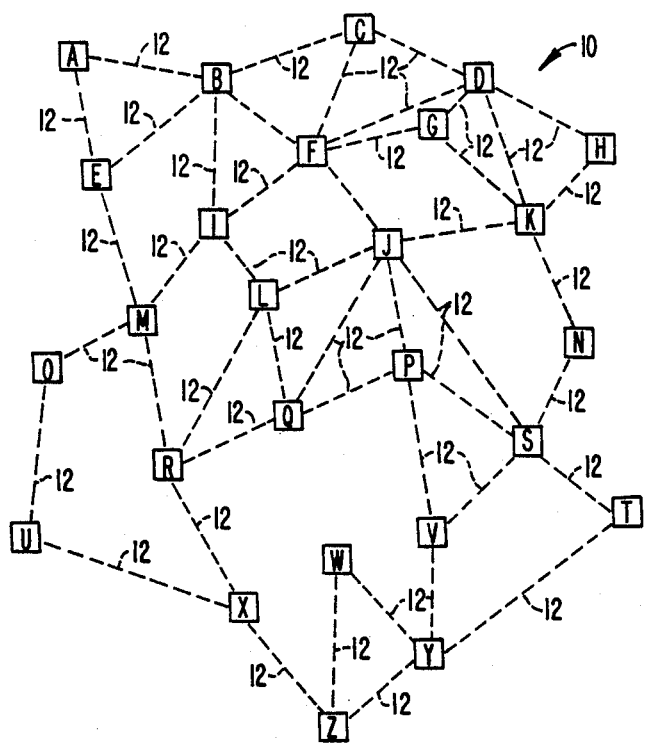
FIG._1.
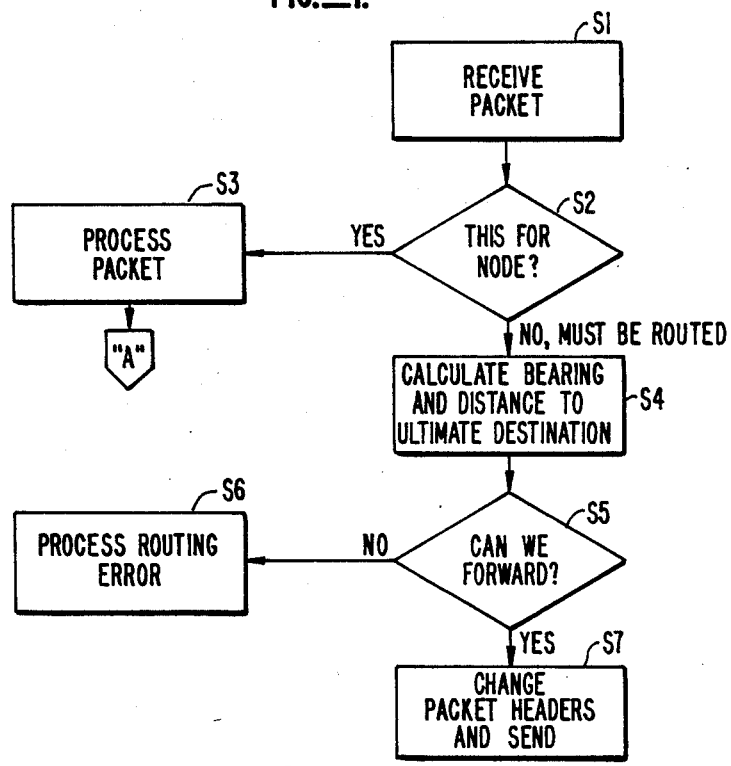
FIG._2.

METHOD FOR ROUTING PACKETS IN A PACKET COMMUNICATION NETWORK

This is a continuation of application Ser. No. 133,720, filed Dec. 16, 1987, now abandoned.

BACKGROUND OF THE INVENTION

1. Field of the Invention

The invention relates generally to a method and system for routing data packets through a packet communication network.

Packet communications is a form of data communications whereby segments or packets of data are routed with error checking and confirmation of receipt directly or relayed via relay stations between a source node or station and a destination node or station. Several methods of data packet routing are known. According to one method, the address in the header of the packet is used as an index to a directory of packet routing lists. Packet routing lists must be prepared with knowledge about the location of each node in the network. Each node is identified by a header identifier. A packet routing list consists of an ordered list of packet node identifiers or call signs. Directory-based routing schemes require continued maintenance and communication of network interconnectivity information employed in the directory. Each of these functions drains network resources and can become intractable in a large network. However, one of the advantages of directory-based routing techniques is that it permits optimization of routing for a wide variety of network parameters, including data delay, throughput, reliability, priority and the like.

Another basic routing technique is the nondirectory-based routing technique. In nondirectory-based routing, the complexities associated with routing techniques are avoided. There is no connectivity information, which thus simplifies construction of each node. However, nondirectory-based routing techniques do not permit network parameter optimization.

2. Description of the Relevant Literature

The following patents were uncovered in a search of prior art with respect to the subject invention:

| Inventor | U.S. Pat. No. | Date of Patent |
| --- | --- | --- |
| Otomo et al. | 4,074,232 | February 14, 1978 |
| Sanders, Jr. et al. | 4,135,156 | January 16, 1979 |
| deCouasnon et al. | 4,168,400 | September 18, 1979 |
| Maxemchuk | 4,516,239 | May 7, 1985 |
| Cohen et al. | 4,525,830 | June 25, 1985 |
| Maxemchuk et al. | 4,534,024 | August 6, 1985 |
| Gable et al. | 4,550,402 | October 29, 1985 |
| George et al. | 4,644,532 | February 17, 1987 |
| Lea et al. | 4,661,947 | April 28, 1987 |
| Lambarelli et al. | 4,663,758 | May 5, 1987 |

The Maxemchuk patents of Bell Laboratories teach the use of data packet systems over cable television networks and also teach the use of variable length packets for voice. The George et al. patent to IBM teaches the use of routing notes utilizing the topology of the network. The Sanders patent teaches the use of satellite communications whereby messages are routed via a local relay station. The Lea patent to Bell Labs teaches the use of a self-routing packet switching network. None of these patents suggest routing based on a node identifier which employs absolute geographic location indicia in the identifier for use in establishing routing.

The remaining patents above relate to the general state of the art of packet communication.

A noteworthy background reference related to radio-based packet communications is the published standard for AX.25 entitled "AX.25 Amateur Packet-Radio Link-Layer Protocol," Version 2.0 (October 1984), Publication No. 56, American Radio Relay League, Inc., Newington, Conn. This protocol is directed to the link layer or level 2 of the International Organization for Standardization (ISO) seven-layered reference model of Open Systems Interconnection (OSI) and is based on the CCITT X.25 level 2 LAPB protocol standard of Recommendation AX.25 of the International Telegraph and Telephone Consultative Committee (CCITT). The AX.25 protocol differs from the X.25 protocol in that the AX.25 protocol provides for repeater stations and repeater linking at the link layer, and specifically up to eight repeater stations under Version 2.0. Whereas the ability to address a destination via a prescribed repeater chain proved to be an advance for link layer protocols, the link remains susceptible to breakdown in linking if the chain is interrupted or changed. As will be explained hereinbelow, the present invention represents a substantial departure from an addressing protocol based on explicitly predefining a routing.

In a theoretical paper first published in March of 1987, less than one year prior to the effective filing date of this application, entitled "Routing and Addressing Problems in Large Metropolitan-scale Internetworks" by Gregory G. Finn, ISI Research Report ISI/RR-87-180 March 1987 (Marina del Rey, Calif.) there appears a description of a Cartesian routing protocol of one form. The Cartesian routing protocol described therein associates a semi-unique ordered Cartesian location with each gateway (node) as part of a Cartesian address combining a location element and a gateway identifier. Position is represented by this location identifier and a metric distance is calculated between two such locations based on the location identifier. Specific reference is made therein to the use of latitude and longitude values as the basis of the Cartesian coordinate system. A hierarchy is suggested therein based on the hop range of reachable nodes in the network. The hierarchy suggested therein is used in conventional telephone networking protocols. The Finn paper is believed to be the only description of a packet routing protocol suggesting use of Cartesian geographical coordinates. Notwithstanding, this paper is not prior art to the subject invention under the patent laws of the United States.

SUMMARY OF THE INVENTION

According to the invention, each node in a packet communication network is uniquely identified by absolute geographical coordinates or by a code indicating absolute location in an external coordinate-based reference system (node coordinates), and such absolute geographical coordinates or the equivalent are employed as part of a packet identifier for each packet generated for use in making routing decisions (packet coordinates). The node coordinates of a local node and its neighboring nodes and the packet coordinates are used by means at each node through which a packet is routed for determining a desired forwarding route of a data packet. The routing may be prioritized according to preselected criteria, preferably achieving optimum forward progress, that is, maximum forward progress using the least amount of power and taking into account characteristics of the system.

The packet routing protocol according to the invention requires no routing directory or table to perform data routing. Each node of the network collects or is otherwise provided with information about the quality of communication between itself and its neighboring nodes within its communication range. When a data packet has been received at a node, it is routed further through the network based on criteria derived from the history of communication between the local node and its neighbors. The criteria include distance, power requirements, retry history (reliability), throughput history, speed of transfer (net data rate), network delay, and data priority. Typically, there is an initialization procedure which is executed to determine the latitude and longitude of neighbors within a destination quadrant, and the criteria are weighted in accordance with preselected preferences to establish, at each subject node, a link quality (LQ) factor for each possible destination local to the subject node. The link quality factor may be used as, or otherwise be used to establish, a metric.

In a preferred form, the metric may be used in to establish a hierarchy among possible local destinations based on the maximum forward progress attainable using the minimum amount of power, herein termed optimum forward progress or OFP. This routing protocol has been found to be superior in very large networks in applications requiring a high rate of packet throughput.

The invention will be better understood by reference to the following detailed description in connection with the accompanying drawings.

BRIEF DESCRIPTION OF THE DRAWINGS

FIG. 1 is a block diagram illustrating a generalized data network topology.

FIG. 2 is a flow chart describing the basic steps of the invention for use with specific routing algorithms.

DESCRIPTION OF SPECIFIC EMBODIMENTS

In accordance with the invention, each node in a network is identifiable by location. Each packet is thereby able to be directed to a destination based primarily on location information contained in a header at the proper level of its data packet. A packet is organized as follows:

|L1H|L2H|L3H|L4H|data|L1T| where:
L indicates "layer";
H indicates "header";
T indicates "tailer."

Layer 1, is the "physical layer," which is responsible for transferring data in a packet in error-free form. If a packet is received which contains an indication of error, the packet is discarded and not acknowledged by the receiver. When sending data, the physical layer performs no error checking, it is not responsible for resending failed packets, and it is not responsible for any form of packet routing. A suitable Layer 1 is organized as follows:

|Layer 1 Header|        |Layer 1 Tailer|
|Start Flag| DL|  · · · |CRC | End Flag| where:
Start Flag is a unique one-byte word signalling the start of a packet;
DL is the Data Length in two bytes;
CRC is a two-byte long cyclic redundancy check word field calculated from the beginning of the data length field through the CRC field;
End Flag is a unique one-byte word signalling termination of the packet.

Where no other fields are variable in length, there is no need for tailers for other layers. Thus all further layer information is contained in the layer header, and only Layer 1 requires a tailer.

Nonflag pad characters which convey no information may precede or trail a packet for timing delay and synchronization without affecting the protocol.

A complete header must contain at least the following information: the address of the ultimate destination in geographic coordinates and the address of the best next hop in geographic coordinates. Only the address of the best next hop is changed when a packet is forwarded. At least part of this information is contained in the Layer 2 header.

The Layer 2 header or ISO link layer header comprises the destination address, the source address, a protype field (packet protocol and type) and a frame identification. A suitable Layer 2 header is organized as follows:

|DA|SA|PT|FID| where:
DA is Destination Address (5 bytes);
SA is Source Address (5 bytes);
PT is packet protocol or packet type (1 byte);
FID is the frame identifier (FID) field.

In accordance with the invention, the destination address is the geographic coordinates of the next local destination and the source address is the geographic coordinates of the local node. Further in accordance with the invention, the destination address of a received packet becomes the source address of the same packet on its retransmission, and the destination address for retransmission is selected by the local node based on analysis of the metrics used to establish optimum forward progress.

The field designated Destination Address is a five-byte address of the desired destination of the local specific packet at the current time in its current form, that is, the Layer 2 destination. It is not the ultimate destination of the packet. Similarly, the field designated Source Address is a five-byte address of the layer 2 source node, the address to which an immediate acknowledgment of receipt is directed. The protype is an eight bit field further broken down into two parts: a four bit protocol designation field and a four bit packet type designation field. The frame identifier field is used to uniquely identify the data frame (DATA) and its related acknowledgment field (ACK) as well as its related acknowledgment of acknowledgment field (ACK-ACK). Packets containing ACK and ACK-ACK are short, since the full data information need not be employed. What is needed are the protype, frame identifier, destination address and source address.

According to the invention, the wide area network (WAN) destination address and source address are also express in terms of geographic coordinates. In a specific embodiment of the invention, the ultimate destination address is contained in a Layer 3 header, which is used for routing a packet between any source and any destination within a wide area net or between wide area nets.

A suitable Layer 3 header is organized as follows:

|WANDA|WANSA|PT|WANFID|LUCK| where
WANDA is the Wide Area Net Destination Address (5 bytes);
WANSA is Wide Area Net Source Address (5 bytes);
PT is packet protocol or packet type (1 byte);
WANFID is the frame identifier field (2 bytes)
LUCK is 1 byte for indicating luck status.

According to the invention, upon receipt of a packet at any node, the Layer 3 header is examined to determine if the WANDA in the header corresponds to the WANDA of the node. If the WANDAs are not identical, the node routes the packet by forwarding it to a next hop in the network in accordance with the protocol supported by the node which is requested by the packet. Several routing protocols are contemplated. The "CROW" protocol is a protocol calling for forwarding in the most direct route, i.e., "as the crow flies." The "WILDFIRE" protocol is a protocol calling for broadcasting the packet to virtually all addressable nodes from the local node, i.e., to spread a packet "like a wildfire." In the wildfire protocol, where several identical packets may be circulating simultaneously, it is helpful to uniquely identify each packet via the WAN-FID so that a receiving node can identify whether the packet has been heard before and hence need not be forwarded. Other protocols may be defined as need arises or as technology develops for use in an installed system.

The luck byte is analogous to a "time-to-live" field in other protocols. It is set by the originator and algorithmically decremented by each transferring repeater until it reaches zero and is "out of luck." It is then treated in accordance with any predefined error handling mechanism. The luck concept prevents wayward packets from endlessly propagating around a network.

The Layer 4 header for data packets contains information needed for delivery of a packet within a local area net (LAN). Within the Layer 4 header is the device identifier, that is, the LAN destination address. A suitable Layer 4 header is organized as follows:

|DA|SA|PT| where:
DA is Destination Address (5 bytes);
SA is Source Address (5 bytes);
PT is packet protocol or packet type (1 byte).

The LAN Destination Address is the identifier of the exact device, e.g., meter, within the LAN. The LAN Source Address is the device identifier of the originating device. It is used by the destination device for formatting a response packet. The packet protocol is as above and may be optionally implemented as needed.

Routing a response back to the source merely involves swapping the LAN Destination Address for the LAN Source Address, assuming the Layer 3 header has been properly rebuilt for the return.

Each device in a network thus has a primary address, namely, the WAN Address, and a secondary address, namely, the LAN Address. The WAN address is the unique latitude and longitude designation of each repeater node, within one second (20 meters) of geographic accuracy. All devices within the LAN of the repeater node use the WAN Address of the repeater node as their WAN Address.

The advantage of use of encoded geographic coordinates is the complete elimination of any requirement for creation and maintenance of routing tables, i.e., a table which contains information on the best path to any destination in the network. The overhead for maintaining a routing table, which increases as the square of the number of nodes, is thereby eliminated. Since direction is inherent in the addressing scheme according to the invention, routing tables are eliminated in favor of decision making at each repeater node on routing in accordance with the requested protocol embedded in the received packets.

It is recognized that multiple use of the same WAN address raises questions about uniqueness of topological designation. It is therefore assumed that the WAN addresses are all unique, and assignments of WAN addresses are so chosen. The LAN addresses provide the device names reachable at each WAN address, and they are also assumed and defined to be unique for each WAN address.

Referring now to FIG. 1, there is shown a data network 10 in a topology in accordance with the invention. The network 10 consists of repeater nodes labelled A through Z interconnected by paths 12 representing allowable communication links between nodes. Consider for example data arriving at a local node J with a destination of node Y. Routing to node Y according to the invention would be most directly routed via node P and node V. Each node would consult its internal neighbor list and route data in turn to the next neighbor node on the path to destination Y.

Alternatively, consider data arriving or originating at local node Q with a destination W. While the geographic location of W is close, since each node is identifiable as according to its latitude and longitude or other geographic location, a more tortuous path is required to route the data, namely via R to X to Z to W.

FIG. 2 is a flow chart illustrating the basic routing method at each node. At each node, the data is first received (Step S1), and then it is determined whether the data is intended for this node (Step S2). If it is, the data is processed at the local node (Step S3). If it is not, the algorithm would calculate the bearing and distance to the ultimate destination based on the geographic coordinate of the destination and the geographic coordinate of the local node (Step S4). Thereafter, the method would determine whether the packet can be forwarded to a neighboring node (Step S5). If it cannot, a routing error is signalled and an error process is initiated. For example, the local node may inform the source, namely the previous node in the path, to resend the packet via another node. Alternatively, the local node may return the received packet to the source node for rerouting using an entirely different routing protocol.

As a part of the forwarding decision, a local table maintained by the local node is examined to determine the best next hop. The best next hop may be based on various criteria including distance, output power required to establish communication, retry history (reliability), throughput history, speed of transfer (net data rate), network delay, data priority, link utilization percentage, closeness to desired destination, closeness to desired bearing, randomness, closeness to local bearing, a link quality factor and the like. In a specific embodiment, optimum forward progress is the primary criterion, that is, maximum forward progress attainable using the least amount of power and taking into account characteristics of the system. This is determined by calculating the metric between the destination coordinate and the neighbor node and selecting the optimum metric among all neighboring nodes of the subject node. Typically, there is an initialization procedure which is executed to determine the latitude and longitude of neighbors within a destination quadrant, and the criteria are weighted in accordance with preselected protocol criteria. The criteria may be adjusted from time to time or automatically based on experience with the network.

History of communication is an important factor in developing and maintaining a local table. For example, history of communication with a dead end node would provide an indication to the local node that such a dead end node is not useful for forwarding packets.

Routing errors are identified by type and processed accordingly. There are for example three types of routing errors, Bad Destination, Can't Get There, Retried Out. Bad Destination errors are errors where the destination node is incorrectly specified. A packet containing a Bad Destination designator will search for the destination until it is discarded by the network. As an alternative, a packet may be examined to ensure that a proper destination address has been specified.

Can't Get There errors are similar to Bad Destination errors, except that a proper destination address has been specified. For example, if no provision is provided to get around a topological obstacle, such an error would be generated. The packet would require retransmission via a more robust protocol if delivery of the packet is to be achieved.

Retry Out errors occur when the network is too busy to handle all packets. Undelivered packets require retransmission at a later time.

Once a decision is made as to which neighbor node is to receive the packet, the local node changes the packet header address by putting the address of the best next hop into an appropriate field of the header and then sending it to the interim destination or neighbor node (Step S7).

The process is repeated for each hop as the receiving neighbor node becomes the local node for the subject packet. The process continues until the packet finds its ultimate destination.

The process of error handling is much simplified because the header inherently carries with it sufficient information to compute distance metrics between a packet and its destination.

The method according to the invention can be used with a variety of routing algorithms and protocols. For example, a maximum forward progress routing algorithm (MFP) may be used. According to the maximum forward to progress algorithm, a node attempts to send data to its neighbor closest to the final destination. In this algorithm, the transmitter power is selected to be whatever is required to establish the link. This technique has particular advantage where transit time is critical.

Alternatively, and preferably in packet applications, a nearest forward progress (NFP) algorithm may be used. In a nearest forward progress algorithm, the local node utilizes the minimum power necessary to link with a neighbor and still make some forward progress. This technique has particular advantage in dense and complex networks where transit time is less critical. It has been found that overall network throughput improves in a very active network when the nearest forward progress technique is employed, as compared to conventional techniques which create large numbers of collisions due to large numbers of active packets in the same broadcast area. This represents a departure from conventional theory which preferred to cause data to be moved as far as possible with each hop on grounds that minimizes relays would avoid delay. A nearest forward progress algorithm uses a channel more efficiently in packet radio communications because transmitters can use lower power and are less likely to be heard by unaddressed stations and therefore are less likely to cause interference due to collisions.

Another useable algorithm is the flooding sink or "Wildfire" algorithm, mentioned hereinabove. In the flooding sink algorithm, the local node routes data to all neighbors (other than the source node). Some directional bias may be applied in order to limit the range within a destination quadrant or hemisphere to which data packets are sent. To prevent packets from circulating indefinitely and to eliminate redundant rebroadcast, a packet is only rebroadcast when heard for the first time.

Finally, a biased random routing algorithm may be employed. The biased random routing algorithm is the simplest routing algorithm. It distributes data relatively quickly and preferably it is biased to deliver data to only one hemisphere so that data is sent to anyone in the correct general direction of the destination.

The invention has now been explained with reference to specific embodiments. Other embodiments will be apparent to those of ordinary skill in the art. It is therefore not intended that this invention be limited except as indicated by the appended claims.

We claim:

1. A method for routing packets of data in a packet data communication network without a network directory comprising the steps of:
   assigning to each node in a network an identifier indicative of geographic location, said identifier including a coordinate value referenced to a terrestrial grid; and
   addressing a packet to an ultimate destination node by designating in a packet header said ultimate destination node only by said coordinate value of said ultimate destination node and without designating a complete intermediate path to said ultimate destination node such that the network is free to route the packet via any intermediate path to said ultimate destination node.

2. A method for routing packets of data without a network directory comprising the steps of:
   assigning to each node in a network an identifier indicative of geographic location, said identifier including a coordinate value referenced to a terrestrial grid;
   addressing a packet to an ultimate destination node by designating in a packet header said ultimate destination node only by said coordinate value of said ultimate destination node and without designating a complete intermediate path to said ultimate destination node such that the network is free to route the packet via any intermediate path to said ultimate destination node;
   at said local node, selecting at least one of said neighboring nodes by using said packet header and other information specific to said local node according to preselected criteria; and
   forwarding said packet to said selected neighboring nodes for eventual delivery to said ultimate destination node.

* * * * *

UNITED STATES PATENT AND TRADEMARK OFFICE
CERTIFICATE OF CORRECTION

PATENT NO. : 4,939,726

DATED : July 3, 1990

INVENTOR(S) : Paul Baran; Robert L. Kalkwarf; George H. Flammer

It is certified that error appears in the above-identified patent and that said Letters Patent is hereby corrected as shown below:

ON THE TITLE PAGE

Item [75] Inventors: please insert --Paul Baran, Menlo Park, CA-- as the first named inventor.

Item [19] "Flammer et al" should read --Baran et al--.

Signed and Sealed this

Fourth Day of February, 1992

Attest:

HARRY F. MANBECK, JR.

*Attesting Officer*    *Commissioner of Patents and Trademarks*